United States Patent [19]

Rao

[11] 4,398,413

[45] Aug. 16, 1983

[54] LEAK DETECTION FOR HERMETIC ENCLOSURES

[75] Inventor: T. V. Rao, Coon Rapids, Minn.

[73] Assignee: Medtronic, Inc., Minneapolis, Minn.

[21] Appl. No.: 264,790

[22] Filed: May 18, 1981

[51] Int. Cl.³ ............................................. G01M 3/20
[52] U.S. Cl. ..................................... 73/40.7; 429/90
[58] Field of Search ...................... 73/40.7, 49.3, 52; 429/90

[56] References Cited

U.S. PATENT DOCUMENTS

| | | | |
|---|---|---|---|
| 3,091,114 | 5/1963 | Webster | 73/49.3 |
| 3,475,226 | 10/1969 | Fraioli . | |
| 3,762,212 | 10/1973 | Morley et al. | 73/40.7 |
| 3,867,201 | 2/1975 | Holmes . | |
| 3,888,111 | 6/1975 | Craig | 73/49.3 X |
| 3,945,846 | 3/1976 | Dey . | |
| 4,174,424 | 11/1979 | Jurva et al. | 73/40.7 X |
| 4,205,551 | 6/1980 | Clifford et al. | 73/52 |

Primary Examiner—Steven L. Stephan
Assistant Examiner—Joseph W. Roskos
Attorney, Agent, or Firm—Everett J. Schroeder; Kenneth D. Siegfried; Robert O. Vidas

[57] ABSTRACT

A method of leak testing hermetic enclosures having a penetrable, self-sealing septum communicating with the interior thereof.

Test gas is introduced into the enclosure by means of a hypodermic needle inserted through the septum and then withdrawn. Subsequent monitoring of the enclosure for presence of any escaping test gas confirms if leakage is occurring.

3 Claims, 2 Drawing Figures

LEAK DETECTION FOR HERMETIC ENCLOSURES

DESCRIPTION

1. Background of Prior Art

Pressure "bombing" of sealed enclosures is used for testing such enclosures for leaks. In testing "bombed" hermetic enclosures, such as transistors, diodes, integrated circuits, sealed electrochemical cells and the like, the sealed enclosure is first placed in an evacuated "bombing" container. The container is then filled with an inert gas, helium is preferred, under pressure, such as 60 PSIG. The sealed enclosure is maintained under such conditions for a period of time to allow a substantial amount of the gas to penetrate into the enclosure if any leaks are present. The sealed enclosure is removed from the "bombing" container, placed in an evacuated test chamber which communicates with a mass spectrometer and is monitored for the presence of any helium. If a leak is present, the helium will have been withdrawn therefrom in the evacuated test chamber to be detected by the mass spectrometer.

This invention provides an improved method for leak detection in sealed enclosures whereby an inert test gas eg., helium can be positively introduced into the sealed enclosure very quickly. The invention provides a self-sealing septum in the sealed enclosure such as in a wall thereof. A hypodermic-like needle is used to penetrate the septum. The enclosure may be evacuated through the needle and then filled with helium or the like, also through the needle. Upon withdrawal of the needle, the septum self-seals. The enclosure may then be placed in the evacuated test fixture and tested for leaks with a mass spectrometer or the like as has been customary in the prior art. A variation including an antechamber and a bombing procedure is described below.

This invention has found particular application in the fabrication of hermetically sealed electrochemical cells and the checking of such cells for leaks. Thus, it is concerned with such cells although it is applicable to any hermetically sealed enclosure having a penetrable, self-sealing septum communicating with the interior thereof. In the case of the electrochemical cells, the septum may also be used for filling same wherein at least one cell component is introduced through the septum as a fluid. This is more fully described in co-pending applications entitled "Electrochemical Cell Construction and Filling Method" and "Electrochemical Cell Construction", filed of even data herewith and assigned to the same assignee. The contents of those applications are incorporated herein by reference.

BRIEF SUMMARY OF THE INVENTION

This invention provides an improvement in the leakage detection of hermetically sealed enclosures wherein a self-sealing septum is included in the enclosure and communicates with the interior thereof for facilitating leak detection. The invention is particularly applicable to electrochemical cell fabrication wherein a cell container includes a penetrable, self-sealing septum.

According to the invention, in the last stage of the process of manufacturing a hermetically sealed enclosure such as an electrochemical cell, after filling, the septum is punctured with a needle and helium or another inert gas which is detectable is admitted to the cell container under pressure, such as about 10 psi, for example. The septum self-seals upon withdrawal of the needle trapping the helium within. The cell is then leak tested for the presence of any helium escaping therefrom.

DETAILED DESCRIPTION OF THE INVENTION

Figure 1:
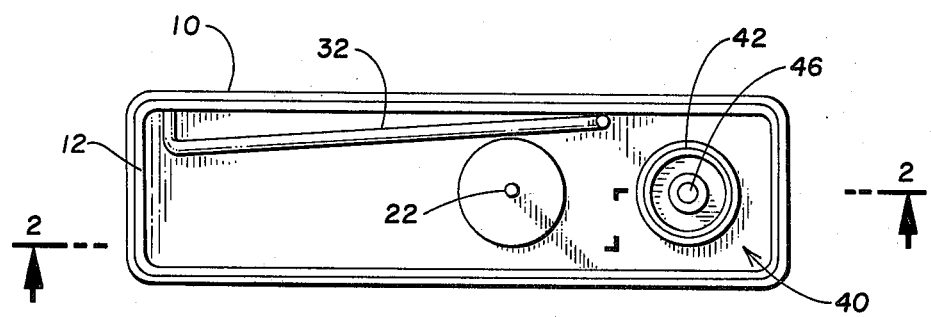
FIG. 1 is a top elevational view of an electrochemical cell illustrating the improved construction of the invention.

The invention is of particular interest in the fabrication of hermetically sealed electrochemical cells. Consequently, it will be described in detail in that context.

Referring now to the Figures, a hermetically sealed lithium-halogen cell is illustrated showing a preferred application of the invention. The cell comprises a container 10 of metal such as stainless steel. Container 10 has an open top or end which is closed by means of a lid 12, also of stainless steel, which is welded to container 10. The cell further includes anode means comprising a lithium element 14 having an embedded anode current collector element 18. Current collector 18 is a relatively thin element of nickel or zirconium. A conductor lead assembly 20 including lead 22 of stainless steel or other suitable metal is spot welded to collector element 18. Electrical lead 22 is of sufficient length to extend out of the container 10 for making an external electrical connection thereto. Conductor 22 is sealed from the remainder of the cell contents by means including an insulator element generally designated 24 which surrounds lead 22. Insulator 24 is of a material which in addition to being a non-conductor of electricity is also non-reactive with the contents of the cell, such as the halogen cathode materials utilized in the cell illustrated. One form of material found to perform satisfactorily are the fluoropolymers, such as the one available under the Tradename "Halar", a trademark of the Allied Chemical Company. Other non-reactive materials may be used for insulator 24.

The anode assembly comprising the lithium element 14 and current collector 18 is preferably fitted within an anode holding or retention means comprised of a peripheral frame member in the form of a band 30 which peripherally encloses the anode assembly leaving the major lateral surface areas of the lithium elements exposed. Band 30 is preferably of the aforementioned fluoropolymer material or any similar material which is non-reactive with the cell contents. In the present illustration, lithium element 14 is of a sandwich-like construction in which two pieces of lithium are brought together with collector 18 therebetween. Band 30 surrounds the peripheral edge of lithium element 14 engaging the peripheral contact surfaces provided at the joint area formed between the lithium pieces. The opposite ends of band 30 are provided with apertures of a size sufficient to receive a portion of insulator 24. These ends are overlapped adjacent the insulator as shown in FIG. 2 to provide a wrap-around structure.

Figure 2:
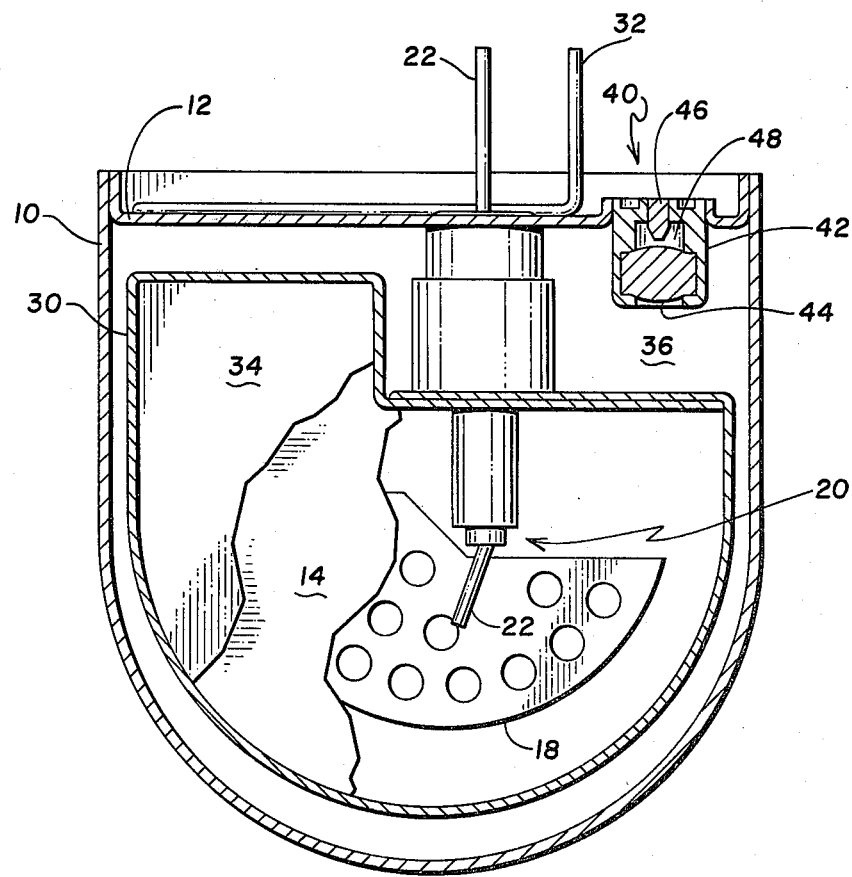
FIG. 2 is a side elevational view in section along line 2—2 of FIG. 1 with parts removed illustrating the invention in more detail.

The anode assembly may be provided with an organic electron donor coating 34 as is known in the art and then positioned in container 10 as shown in FIG. 2 with the anode operative surfaces spaced from the inner surface of the container. Lid 12 is then welded to container 10.

In the particular embodiment illustrated container 10, being of electrically conducting material, serves as a cathode current collector in direct contact with the cathodic contents of container 10. Consequently, an electrical lead 32 may be attached directly to container 10 for cathodic contact.

In the prior art, a halogen cathode material 36 such as iodine or bromine contained in an organic donor component material, as is also known in the art, was then poured through a suitable filler opening in lid 12 to fill container 10 and operatively contact the exposed surfaces of the lithium anode. For example, a common cathode material is prepared by heating a poly(vinylpyridine) organic material, such as poly(2-vinylpyridine), mixed with iodine, to a temperature greater than the crystallization temperature of iodine, for example about 300° F. Consequently, the mixture becomes fluid. The amount of iodine is ordinarily greater than about 50% by weight of the resulting mixture so that enough iodine is available in the cathode material to provide sufficient conductivity for cell operation. The resulting mixture upon heating was poured into container 10 to substantially fill it. The amount of material introduced into the container is preferably sufficient to contact the lateral surfaces of lithium element 14 and to reach a level at or adjacent the interior surface of lid 12. The opening in lid 12 was then hermetically sealed with a series of plugs such as an inner Teflon plug and an outer stainless steel plug or plugs (not shown).

In accordance with the present construction the foregoing filler arrangement and plug construction is modified by means of the improved sealing subassembly generally indicated at 40. Subassembly 40 includes a metal sleeve 42 of stainless steel or the like which includes a penetrable self-sealing septum 44, preferably at an inner location as shown in FIG. 2. Sleeve 42 is welded into an opening in lid 12 as shown. Self-sealing septum 44 may be molded into sleeve 42 or it may be performed and seated in the sleeve by forming the sleeve around septum 44 as shown. Any other means suitable for sealing the septum in the sleeve may be used. Self-sealing septums and the materials therefor are knonw. They are made of a flexible, resilient body of a suitable material such as rubber which seals itself when punctured. Typically, a silicone rubber, a fluoro-silicone rubber or fluoro-carbon rubber may be used. The latter is available under the tradename Viton, a trademark of DuPont. A thickness on the order of 0.080 inches is satisfactory although this is not critical so long as sealing is assured. Thus, thickness may vary over a wide range.

With such a septum in place as shown in the drawing, a hypodermic-like needle may be inserted through septum 44 by means of which container 10 may be evacuated and then filled with a fluid component or components of the cell, such as the aforementioned cathode material 36.

Optionally, after sealing the filler opening with the self-sealing septum, the septum may be penetrated with first and second hypodermic-like needles. Container 10 may be evacuated by drawing a vacuum through the first needle and filled by introducing the fluid component through the second needle as the vacuum is drawn through the first needle or after the container has been evacuated.

In the case of a fluid component of the type described above i.e., a halogen/organic material, it must be melted by heating to achieve a fluid state.

A #22 hypodermic needle has been found satisfactory for use with this invention. One such needle may be connected to a vacuum pump capable of drawing a vacuum on the order of about $10^{-4}$ microns. The needle may be withdrawn from the septum in which case the septum self-seals. Another needle, a #18 is satisfactory, may be connected to a source of fluid cell component. Upon introduction through the septum, the vacuum in the container draws the fluid component until the container is full without voids.

In accordance with this invention, after the container is filled, the septum is again punctured with a needle through which helium is admitted to the cell interior at approximately 10 psi. The needle is then withdrawn allowing the septum to self-seal closed. Following the admission of helium to container 10 by means of penetration of the self-sealing septum 44, metal plug 46 is inserted into sleeve 42 and preferably welded into position. As can be seen, an antechamber or open space 48 exists between plug 46 and septum 44. The leak test of the cell in an evacuated fixture communicating with a mass spectrometer, as is known, reveals any fine leaks or gross leaks by the detection of helium escaping through the septum due to permeation or through a defective weld, if any, of the closing plug 46 or at any other location on the container.

Antechamber 48 is important for fine leak checkability. This is a void volume that is filled with helium during the "bombing" operation. When a fine leak is present in the weld between the plug 46 and sleeve 42, the helium escapes through this fine leak to be detected by the helium mass spectrometer.

While the preferred embodiment has been described in detail, this has not been done for purposes of limitation but by way of illustration. The invention is intended to be defined by the following claims:

I claim:
1. A method for detecting leaks in a sealed enclosure, comprising the steps: providing self-sealing septum means communicating with the enclosure interior;
  penetrating the septum means with hypodermic-like needle means;
  evacuating the enclosure interior through the needle means;
  introducing an inert gas to the enclosure interior through the needle means;
  withdrawing the needle means from the septum whereby it self-seals;
  placing the sealed enclosure in an evacuated test fixture in communication with means for detecting the gas; and
  testing for the presence of gas escaping from the sealed enclosure.
2. The method of claim 1 wherein:
  the enclosure includes an outer plug means and the septum is disposed inwardly thereof and spaced therefrom to provide an antechamber therebetween;
  the plug means is sealed in place after the gas has been admitted to the enclosure, through the septum; and
  the enclosure is thereafter placed in the evacuated fixture and tested for leaks.
3. The method of claim 2 wherein the enclosure is subjected to a "bombing" procedure prior to being tested for leaks in the evacuated fixture.

* * * * *